(12) United States Patent
Sasanuma et al.

(10) Patent No.: US 7,068,393 B2
(45) Date of Patent: Jun. 27, 2006

(54) IMAGE RATIO MEASURING METHOD FOR IMAGE FORMING APPARATUS

(75) Inventors: Nobuatsu Sasanuma, Chiba (JP); Makoto Kanbayashi, Shizuoka (JP); Kazuo Suzuki, Kanagawa (JP); Yuichi Ikeda, Chiba (JP); Kenichi Nakagawa, Kanagawa (JP); Tomohisa Itagaki, Chiba (JP); Nobuhiko Zaima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/026,718

(22) Filed: Dec. 27, 2001

(65) Prior Publication Data

US 2002/0109856 A1 Aug. 15, 2002

(30) Foreign Application Priority Data

Dec. 28, 2000 (JP) ............................. 2000-403333
Dec. 28, 2000 (JP) ............................. 2000-403336
Dec. 21, 2001 (JP) ............................. 2001-390459

(51) Int. Cl.
*B41B 1/00* (2006.01)
*G06K 1/00* (2006.01)
*G03F 3/08* (2006.01)
*H04N 1/46* (2006.01)
*G03G 15/10* (2006.01)

(52) U.S. Cl. ...................... 358/1.9; 358/521; 358/504; 358/523; 358/1.2; 399/61

(58) Field of Classification Search ................. 358/1.9, 358/1.2, 3.23, 521, 504, 523; 399/58, 61
See application file for complete search history.

(56) References Cited

U.S. PATENT DOCUMENTS 5,040,023 A * 8/1991 Yokoyama ................... 399/58
5,416,613 A 5/1995 Rolleston et al. ........... 358/518

FOREIGN PATENT DOCUMENTS

| JP | 05-027593 | 2/1993 |
| JP | 05-303281 | 11/1993 |
| JP | 11-184336 | 7/1999 |
| JP | 11-184336 A | 9/1999 |
| JP | 2000-162931 | 6/2000 |

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto (57) ABSTRACT

Image data supplied to an image forming apparatus are converted into image data linearly correlated with the image density, and the image ratio is calculated by dividing the number of pixels in which the toner is deposited during image formation based on the thus-converted image, with a value obtained by multiplying the total pixel number corresponding to the size of the print medium with the number of gradation levels per pixel. Then the toner amount consumed in the image formation based on the entered image data is determined by multiplying the image ratio, the size of the print medium to be used and the toner amount consumed per unit area in a solid image formation.

17 Claims, 5 Drawing Sheets

IMAGE RATIO MEASURING METHOD FOR IMAGE FORMING APPARATUS

BACKGROUND OF THE INVENTION

1. Field of the Invention

The present invention relates to a method for measuring an image ratio, for use in an image forming apparatus for forming an image by fixing a coloring agent to a recording sheet based on image data outputted from an image data supplying apparatus. The method is to be used for evaluating the characteristics of the image forming apparatus relating to the amount of consumption of the coloring agent or print agent, or for detecting the remaining amount of the print agent.

2. Related Background Art

In an image forming apparatus capable of image formation by depositing a coloring material or a print agent onto a printing medium, such as a laser beam printer or other electrophotographic printer which achieves printing by depositing toner particles onto the printing medium or an ink jet printer which achieves printing by discharging ink consisting of dispersion of a coloring agent such as a dye or a pigment onto the printing medium, there is provided means for measuring the amount of consumption of the coloring material or print agent by various methods. The information obtained by such measurement of consumption amount is not only important in evaluating the characteristics of the image forming apparatus but also is useful and important for the user in knowing in advance when the replenishment of the print agent becomes necessary.

For this reason, there have been proposed various methods for detecting the remaining amount of the print agent. For example, Japanese Patent Application Laid-Open No. 05-006092 proposes, for detecting the remaining amount of the developer, a so-called antenna method of detecting the electrostatic capacitance, which varies according to the remaining amount of the developer. Also, Japanese Patent Application Laid-Open No. 05-027593 proposes an optical sensor system in which an optical sensor is positioned on a replenishing path and an optical path is opened when the toner is entirely consumed, thereby indicating that the remaining amount of the toner has become less than a predetermined amount, and Japanese Patent Application Laid-Open No. 05-303281 proposes a system utilizing a piezoelectric element for detecting the remaining amount of the toner by the weight thereof.

However, these methods have not proved able, in case of a printing job of a large amount, to judge whether the toner or the ink is present in an amount sufficient for completing a current job, so that it sometime occurs that the exhaustion of the developer or the ink is detected in the course of the printing job, as a result of which the job is inevitably interrupted.

In this connection, as one of the means for measuring the consumption amount of the coloring material or print agent in an image forming apparatus, there is known a method of defining the image ratio as the area in which image formation is executed with respect to that of the print medium and acquiring the amount of the coloring material or print agent consumed in image formation on the print media of a predetermined number, based on such image ratio. More specifically, in a case of an image forming apparatus executing image formation based on digital image data, the image ratio is defined as the ratio (the so-called print ratio) of the number of pixels in which the coloring material or print agent is deposited to the number of total pixels of the image of the maximum size that can be formed by the image forming apparatus on the printing medium of a specified size.

However, that method for detecting the consumption amount of the coloring material or print agent has been associated with the following drawbacks.

The above-mentioned definition becomes valid in a case in which the image formation is executed by the presence or absence of deposition of the coloring material or print agent in each pixel, that is in a case of image formation based on binary image data. Therefore, the detection of the consumption amount of the coloring material or print agent based on such image ratio becomes relatively accurate, but the definition of the image ratio itself is problematic in a case of multi-value image data having tonal gradation, such as a photographic image. Particularly, in the case of full-color image formation, the image ratio cannot be appropriately defined for various reasons, such as (1) that the image data supplied to the image forming apparatus have various signal formats, such as the standardized RGB (Red, Green and Blue) data (sRGB data) or CMYK (Cyan, Magenta, Yellow and Black) data, and (2) that the relationship between the image signal and the consumption amount of the coloring material or print agent in the intermediate density range may be complex.

SUMMARY OF THE INVENTION

An object of the present invention is to provide a method for measuring the image ratio, not associated with the aforementioned drawbacks.

Another object of the present invention is to provide an image ratio measuring method capable of defining the image ratio in correlation with the consumption amount of the coloring material/print agent both for binary image data and for multi-value image data, thereby enabling exact detection of the consumption amount of the coloring material/print agent.

Still another object of the present invention is to provide an image forming apparatus capable of calculating the number of outputtable sheets and informing the user of such number, thereby improving the convenience of use.

Still other objects of the present invention, and the features thereof, will become fully apparent from the following description to be taken in conjunction with the accompanying drawing and from the appended claims.

DETAILED DESCRIPTION OF THE PREFERRED EMBODIMENTS

Now the present invention will be clarified in detail by a description of the preferred embodiments thereof, with reference to the accompanying drawings.

First Embodiment

Figure 1:
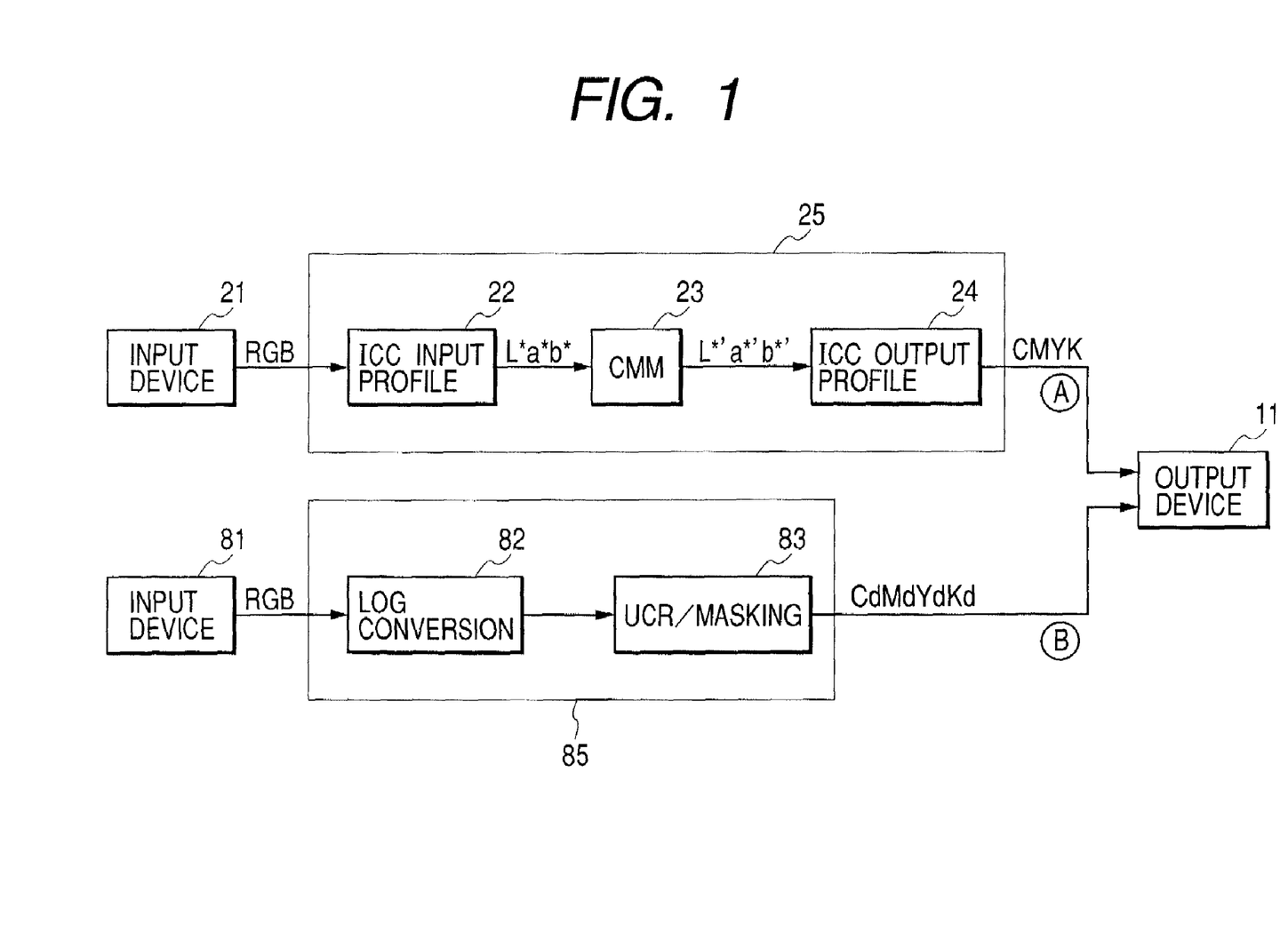
FIG. 1 is a block diagram showing the configuration of an image forming system.

FIG. 1 shows an example of the configuration of an image forming system, executing image processing from image data input to full-color output. In such image forming system, there have been proposed various flows for color management taking color reproducibility into consideration, but, in the upper part of FIG. 1, there is shown a configuration employing the flow of the recently utilized ICC (International Color Consortium).

Image data are transferred from an input device 21 to an image processing unit 25 in a RGB (Red, Green, Blue) data format dependent on such input device. In the image processing unit 25, an ICC input profile conversion unit 22 executes conversion from the RGB image data dependent on the input device 21 into color coordinate signals of L*, a*, b* uniform color space (CIELAB space) independent of the input device, where L* represents luminosity, and a*, b* are chromaticity indicating hue and saturation. The conversion can be achieved by a so-called direct mapping method utilizing a multi-dimensional LUT (Look-up Table), and interpolation control is also often utilized in consideration of the resolution of the signals.

The image signals L*, a*, b* converted into the color coordinates in the uniform color space are subjected, in a CMM (Color Management Module) 23, to a GAMUT conversion for obtaining as beautiful an output image as possible in consideration of the correspondence between the reading color space of the input device 21 and the reproducing color space of the output device 11 and a color conversion for adjusting the mismatching between the type of light source at the image reading and the type of light source at the observation of the print (also called mismatching in the color temperature setting), thereby being converted into image data L*', a*', b*' within the color reproduction range.

Then the image data consisting of the color signals L*', a*', b*' within the color reproduction range are converted, by an ICC output profile conversion unit 24, into CMYK (Cyan, Magenta, Yellow, Black) signals dependent on the output device 11, and such signals are used for image formation on the print medium in the output device 11.

Since the characteristics of the coloring materials such as toner or ink or printing agents (hereinafter collectively called "coloring agents") and the image data processing method employed in the output device are different depending on the manufacturer and type of the output device, the CMYK signals obtained by conversion in the ICC output profile conversion unit 24 and transferred to the output device are inevitably dependent on the output device 11 and are therefore not yet unified completely. Such CMYK signals to be received by the output device will be called "signals of section A". Such "signals of section A" vary depending on the output device. Also, even among the output devices capable of receiving given "signals of section A", each output device often executes data conversion therein into appropriate data according to its characteristics in order to execute image formation. However, such data are basically converted in order to achieve image output of the highest quality in the image forming means, and have little meaning for controlling the amount of the coloring agents to be used in the image formation. Also, the signal level and the density are often not in a linear relationship.

In any case, the relationship between the CMYK signals (signals of section A) received by the output device and the consumption amount of the coloring agents is not uniquely determined, so that the amount of the coloring agents actually consumed in an output device cannot be estimated simply from the received CMYK signals.

Figure 2:
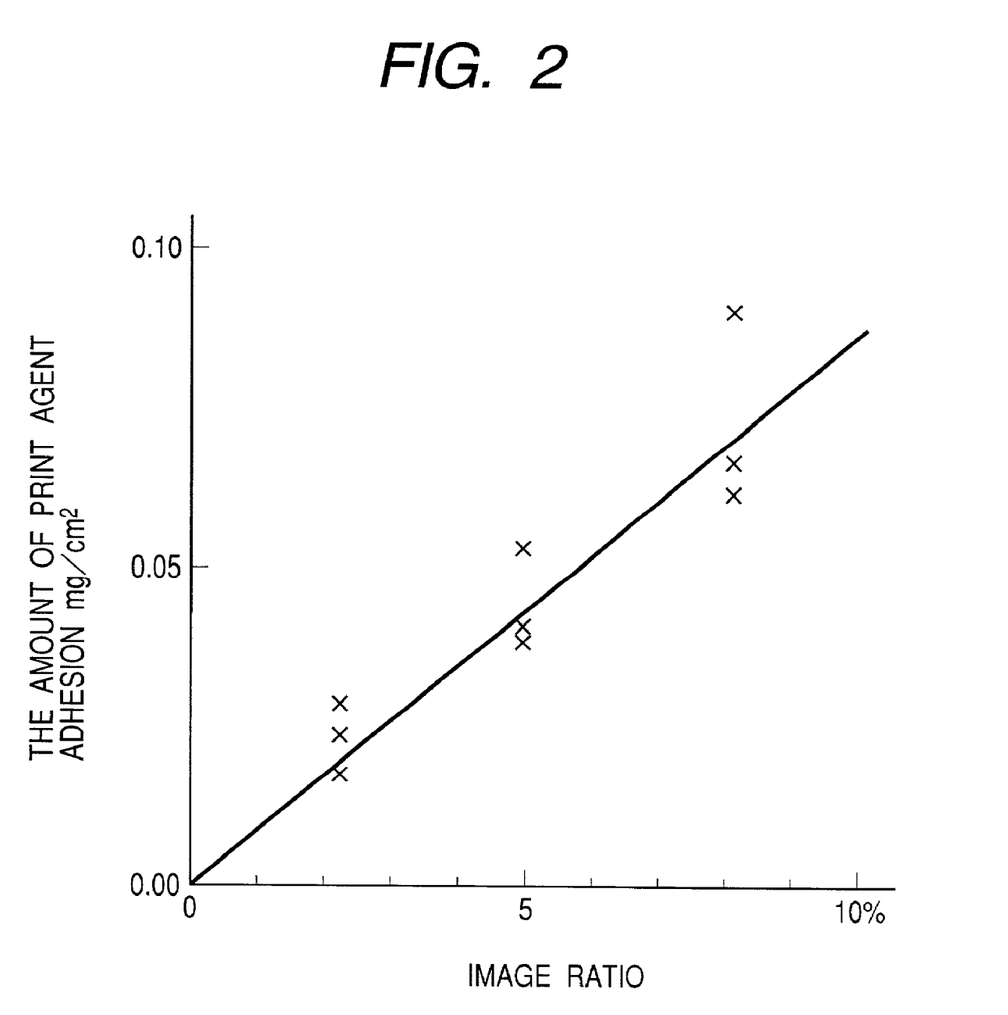
FIG. 2 is a view showing the relationship between the image ratio and the deposition amount of the coloring material.

Therefore, the present inventors have intensively investigated image data which can provide an image ratio showing a strong correlation with the consumption amount of the coloring agents. In such investigation, a laser printer "Color Laser Copier CLC800" (resolution: 400×400 dpi, number of gradation levels: 8 bits (256 levels)) manufactured by Canon Co. was employed as the image forming apparatus. As a result, it was found that the image ratio defined by the following equation (1) had a strong correlation with the consumption amount of the printing agents (in this example, consumption amount of the toners constituting the coloring agents) as shown in FIG. 2:

$$\text{Image ratio (\%)} = (\Sigma Dsig)/(Pall \times Step) \times 100 \tag{1}$$

where "Dsig" is a signal value of Nbits (for example N=8) obtained by normalizing the image data with the image density scale of a pixel unit, and is more specifically obtained by converting the minimum and maximum densities of the actually formed image to values of 0 to 255. "ΣDsig" is the total sum of such signal value on the print medium on which the image formation is executed. "Pall" is the total number of pixels when the contemplated size of the print medium is divided by the resolution of the image recorded by the image forming apparatus (for example 400×400 dpi), and "Step" is the number of gradation levels (for example, 256) per pixel.

The image density can be determined by the following equation (2):

$$\text{Image density } D = -\log 10(I/I_0) \tag{2}$$

where $I_0$ is the intensity of light irradiating the image, and I is the intensity of the reflected light. The presence of correlation between such image density and the amount of the printing agents means that Lambert-Beer's law stands in this case.

Lambert-Beer's law indicates that the amount of the coloring agents is proportional to the image density, that is, that the image density is doubled when the amount of the coloring agents is doubled, and the image forming apparatus based on the density gradation reproducing method generally matches this model. The copier CLC800 employed in this investigation is an electrophotographic color copier which is generally considered to correspond to the area gradation reproducing method and is not expected to provide the result shown in FIG. 2, but the present inventors have executed verification in the following model.

Figure 3A:
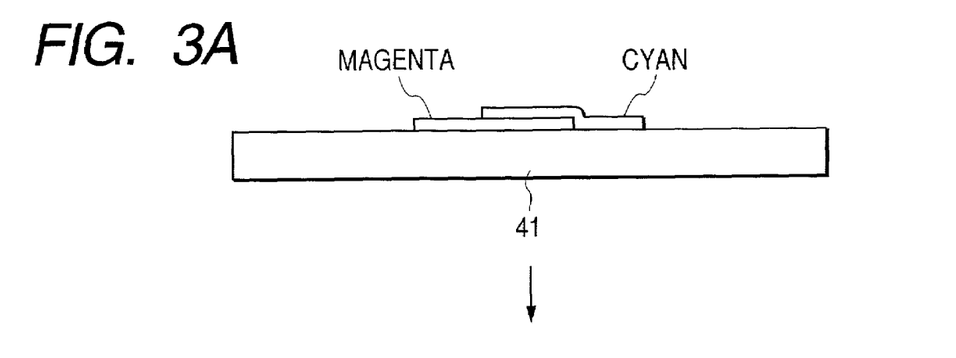
FIGS. 3A and 3B are views showing a color mixing state of color toners.

FIG. 3A shows a state where magenta toner and cyan toner are deposited, with partial overlapping, on a print medium 41. The fixation of such toners onto the print medium 41 by a heat-pressure fixing step of the electrophotographic process provides a state shown in FIG. 3B. The overlapping portion of the magenta toner and the cyan toner appears blue since such toners are sufficiently fused and mixed.

Figure 3B:
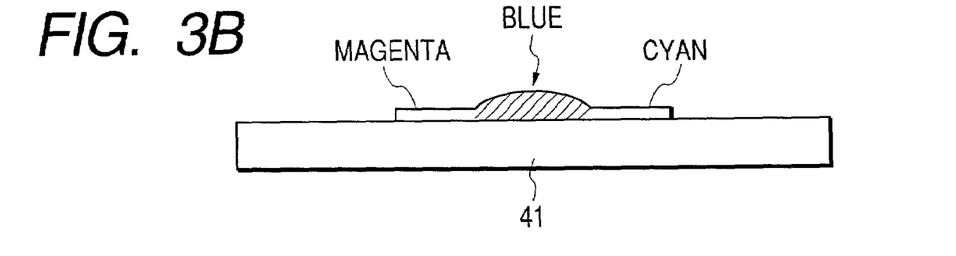
Figure 4:
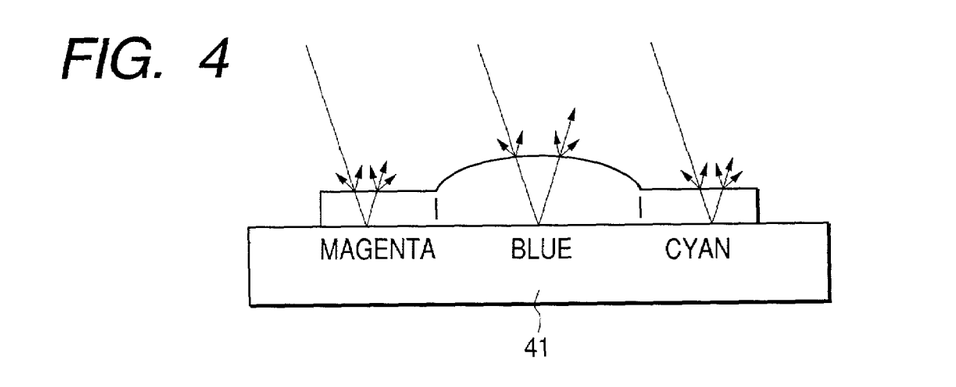
FIG. 4 is a view showing entry and reflection of the light in the toner on a print medium.

This phenomenon is presumably explicable by a fact that the light entering the toner is first subjected to absorption of a specified wavelength component in the fixed toner layer, is then reflected from the surface of the print medium 41 and comes out through the toner layer again. Thus, Lambert-Beer's law becomes dominant even in the area gradation reproducing method if the employed coloring agents have a certain light transmittance.

The consumption amount of the coloring agents can be determined by multiplying the image ratio obtained from equation (1), the pre-measured consumption amount of the coloring agent per unit area in a solid image, and the size (area) of the recording sheet, as follows:

$$\text{Consumption amount} = \text{image ratio} \times C_{FF} \times \text{area} \quad (3)$$

where $C_{FF}$ is the consumption amount of the coloring agent per unit area in the case of recording a solid image of a signal level 255, to be measured in advance in each image forming apparatus.

Figure 5:
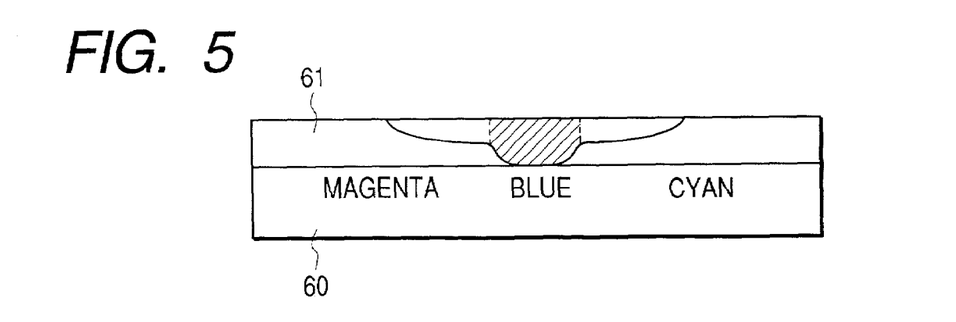
FIG. 5 is a view showing a color mixing state of inks.

FIG. 5 shows a state where, in an ink jet printing apparatus, a magenta ink dot and a cyan ink dot are deposited, with partial overlapping, on a print medium 60 provided with an ink absorbing layer 61. Also in this case, the light is first subjected to absorption of a specified wavelength component by the coloring agent dispersed in the ink absorbing layer 61, is then reflected by the surface of the print medium 60 and comes out of the surface layer. Also in such model, the image ratio calculated from the image density signal shows a clear correlation with the consumption amount of the coloring agent, and such correlation is already experimentally confirmed.

Again referring to FIG. 1, an image processing unit 85 shown in the lower part converts the RGB data outputted from the input device 81 into image density signals, namely signals in proportional relationship with the density, for supply to the output device 11.

The image processing unit 85 is provided with a logarithmic conversion unit 82 and a masking/UCR unit 83. The logarithmic conversion unit 82 converts the RGB data, outputted from the input device 81, into C, M, Y density data based on equation (2), and may be composed of a lookup table for example in a ROM, for executing the aforementioned conversion. The masking/UCR unit 83 extracts a black component (K) from the density data and applies a matrix calculation for correcting the color turbidity of the printing agents to the C, M, Y, K color data, thereby outputting image signals CdMdYdKd of 8 bits for each color, in linear proportional relationship with the density.

Figure 6:
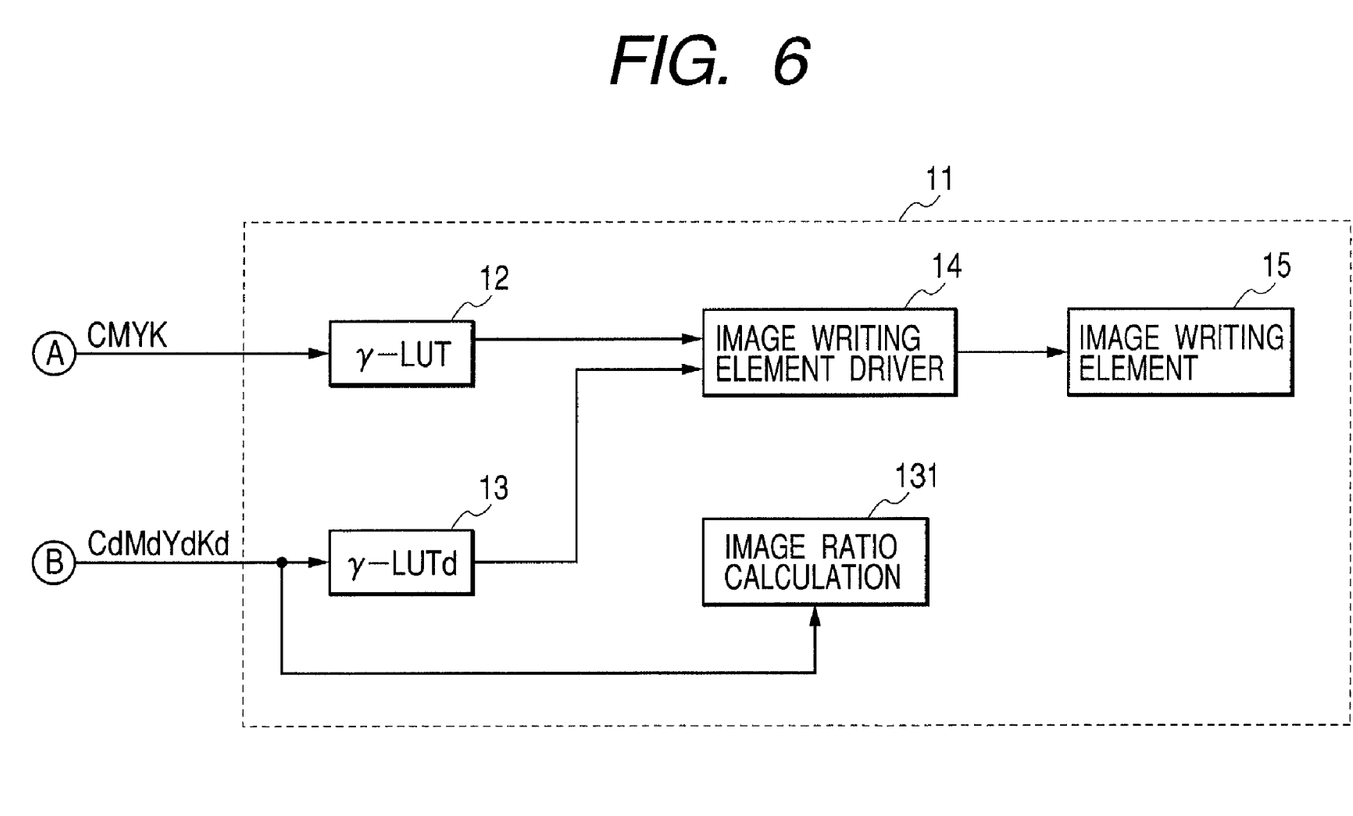
FIG. 6 is a block diagram of showing the configuration of an output device constituting a first embodiment of the present invention.

FIG. 6 shows an example of the configuration of the output device 11 in the system shown in FIG. 1.

In image formation, the output device 11 is normally given the image signals of section A and executes characteristic conversion therein necessary for image formation. More specifically, there is provided a circuit (hereinafter called a "γ-LUT") 12 equipped with an LUT for density characteristic conversion ("γ-conversion") for achieving image formation of satisfactory quality in a suitably calibrated state based on the signals of section A, and the data subjected to the density characteristic conversion are transferred to an image writing element driver 14. However, as explained in the foregoing, it is not possible simply to estimate the actual consumption amount of the coloring agents based on the signals of section A.

Therefore, the output device 11 of the present embodiment is also provided with an input unit capable of receiving signals in linear proportional relationship with the density, namely the image data CdMdYdKd (hereinafter called signals of section B) correlated with the consumption amount of the coloring agents. Based on the received signals of section B, an image ratio calculation unit 131 executes an operation according to the foregoing equation (1), thereby determining the image ratio.

The output device 11 shown in FIG. 6 is further provided with a characteristic conversion circuit (hereinafter called "γ-LUTd") 13, which stores conversion data for executing characteristic conversion so as to attain an initial image quality of the output device 11, based on the CdMdYdKd signals (signals of section B) received by the output device 11. The presence of such means allows the output device to adapt to an image forming system in which the signals of section B alone are provided.

In the configuration shown in FIG. 6, the image writing element driver 14 is used for driving an image writing element 15 constituting an engine for image formation on the print medium (for example, a laser light source or a control unit therefor in a laser beam printer, or a heat generating element, a piezoelectric element or a control unit therefor for generating energy to be utilized for ink discharge in an ink jet printer).

Also, in the above-described configuration, the input devices 21, 81 constituting the supply source of the image data can be composed of a computer or the like (personal computer, work station, server etc.), a memory medium storing image data or an apparatus for reading such stored data.

Also, the image processing units 25, 85 shown in FIG. 1 may be realized as one of the functions executed by a computer constituting the image data supply source, but may also be provided in the image forming apparatus including the output device 11. It is also possible to provide the input devices 21, 81 and the output device 11 with parts of the configuration of the image processing units 25, 85 thereby realizing the function of the image processing units 25, 85 in the entire system. Also in case of providing the computer (input devices 21, 81) with all the configuration of the image processing units 25, 85 or a part thereof, the function of such image processing units may be executed as a function of a printer driver to be installed in the computer. Otherwise, all such function or a part thereof may be realized by hardware.

Furthermore, the image forming system shown in FIG. 1 may assume a form in which a part of the configuration is constituted as an independent apparatus, or a form in which the entire configuration is integrally constructed as a copying apparatus or a facsimile apparatus.

Second Embodiment

In the foregoing embodiment, there has been explained a configuration provided with an input unit capable of receiving the image data signals CdMdYdKd (signals of section B) correlated with the consumption amount of the coloring agents, and capable of determining the image ratio based on the received signals of section B. In contrast, the second embodiment provides a configuration for determining the image ratio based on the signals of section A. Such configuration allows the output device to adapt to an image forming system in which the signals of section A alone are provided.

Also, the foregoing first embodiment is rendered capable of evaluating the characteristics of the output device relating to the consumption of the coloring agents based on the image ratio, but the present embodiment is rendered capable of detecting the remaining amount of the coloring agents based on the image ratio.

Figures 7, 8:
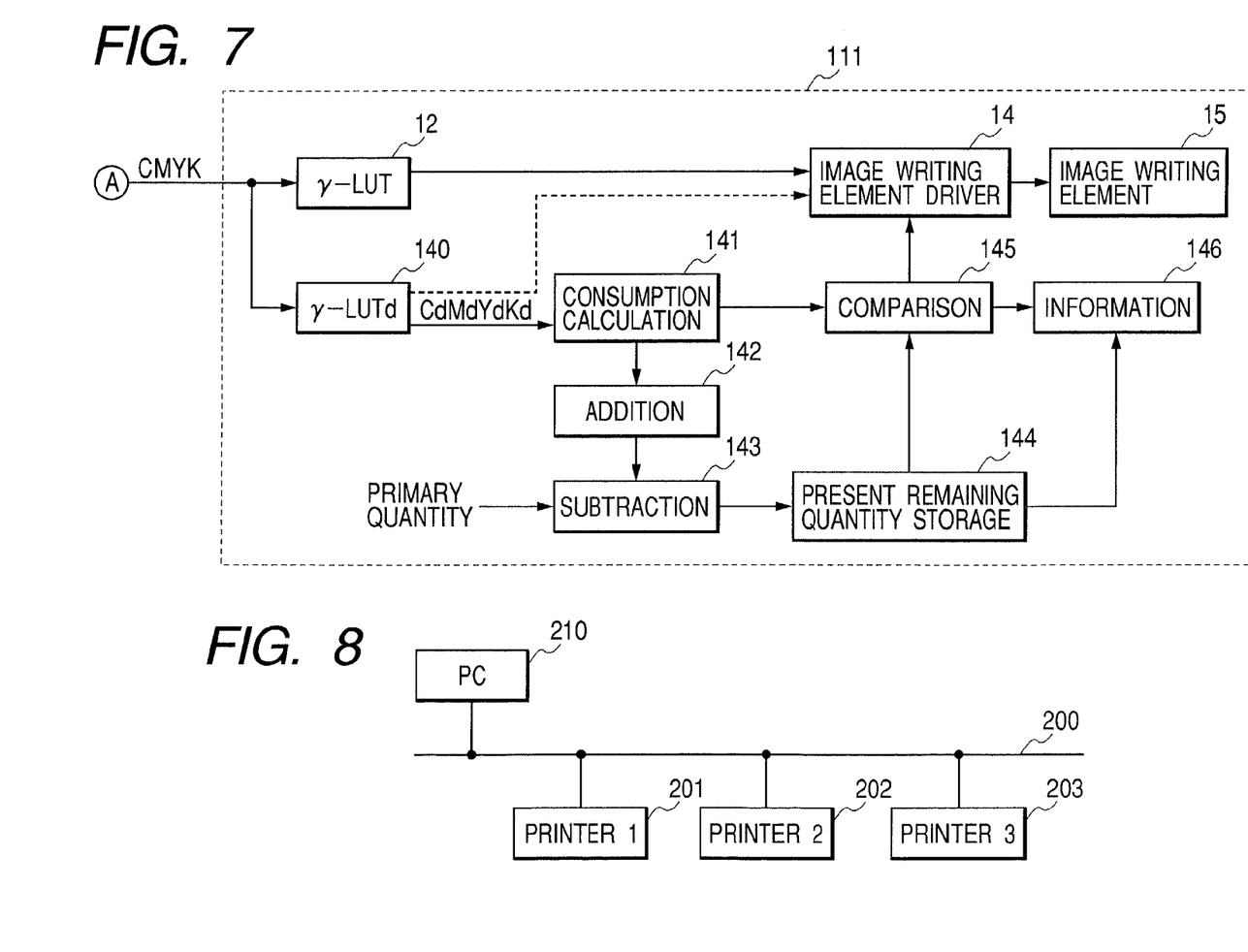
FIG. 7 is a block diagram of showing the configuration of an output device constituting a second embodiment of the present invention.
FIG. 8 is a block diagram showing the configuration of a communication system constituting another embodiment of the present invention.

FIG. 7 shows an example of the configuration of an output device 111 employed in the second embodiment of the present invention, wherein components equivalent to those in FIG. 6 are represented by like numbers.

In the present embodiment, the path of the signals of section A supplied to the Y-LUT 12 is branched, and such branched path is connected to a γ-LUTd 140, which stores conversion data for converting the signals of section A so as to generate image data signals CdMdYdKd (linearly proportional to the gradational density) correlated with the consumption amount of the coloring agents.

A consumption amount calculation unit 141 determines the image ratio for each color according to the foregoing equation (1) based on the signals CdMdYdKd supplied from the γ-LUTd 140, and calculates the consumption amount of each coloring agent based on the image ratio. The image ratio is calculated for each color according to equation (1). Also, the value obtained by such calculation is correlated with the amount of the printing agent consumed in the image formation, and allows determination of the consumption amount of the printing agent by the foregoing equation (3) according to the image forming method of the output device 111. For example, in an electrophotographic printer such as a laser beam printer, the actually used amount of the toner can be obtained by multiplying by a certain constant coefficient. In an ink jet printer, too, there may be executed a process for matching with the consumption amount of the ink, based on the content of the coloring agent in the ink solvent.

In an electrophotographic image forming apparatus, it is already known that toner is consumed by so-called "fog" phenomenon even in an image of a signal level 0. There is also executed formation, on the print medium, of a toner patch for controlling the image forming conditions, in addition to ordinary image formation. It is therefore desirable, in order to improve accuracy, also to consider toner consumption resulting from factors other than the image signals used for ordinary image formation.

The calculated value is accumulated by an accumulation unit 142, and a subtraction unit 143 subtracts the accumulated value from the initial amount of the printing agent. Thus, from the initial amount of the toner or ink, detectable at the replacement of a toner cartridge in an electrophotographic printer such as a laser beam printer or an ink tank in an ink jet printer, the accumulated value of the printing agent consumed after such replacement is subtracted from time to time to obtain information indicating the current amount (remaining amount) of the printing agent, and such information is retained in a current amount memory unit 144 composed for example of an EEPROM. In a case where the output device 111 is an ink jet printer, there is also considered the amount of the ink consumed other than for image formation, for example in the so-called recovery process.

A comparison unit 145 compares the consumption amount of the printing agents calculated on the image data with the current amount of the printing agents, and, if it is confirmed that the current amount of the printing agents is enough for the image formation based on those image data, the actual printing operation is instructed to the image writing element driver 14. On the other hand, if the current amount of the printing agents is not enough, an informing unit 146 composed for example of a display unit or a sound generator informs the user that the printing agents will run out in the course of the printing operation. Thus the user can execute replenishment of the printing agents (for example replacement of the toner cartridge or the ink tank) or preparation therefor.

The aforementioned components 12, 14, 141 to 146 may be realized by hardware composed of a combination of logic circuit elements, and predetermined functions may be realized by software.

Also, by dividing the current amount of the printing agents with the calculated consumption amount (or with the number of prints), there can be determined the approximate number of prints that can still be made, and, by displaying thus determined number in the informing unit 146, it is rendered possible to judge whether the printing agents should be replenished in advance at the setting of the number of prints for an original image. Otherwise, there may be displayed a message requesting the replenishment if the set number of prints is larger than the possible number of prints when the number of prints is set by the user.

Other Embodiments

It is also possible to provide an input unit capable of receiving the signals of section B and means for determining the image ratio based on the thus-received signals of section B and detecting the remaining amount of the coloring agents based on such image ratio. It is furthermore possible to provide means for determining the image ratio based on the signals of section A and to construct the configuration in such a manner as to evaluate the characteristics of the output device relating to the consumption of the coloring agents based on such image ratio.

Also, the process based on the remaining amount of the printing agents detected in the output device can be not only the predetermined information to the user in the informing unit provided in the output device as explained in the foregoing, but also information to a host apparatus (for example a computer) connected to the output device for displaying the information at host apparatus.

The present invention is applicable not only to an output device or an image forming apparatus used on a stand-alone basis but also to a configuration where plural output devices or image forming systems are connected through a network. For example, in a situation where plural printers are connected to a network, a print command is issued from a host apparatus (personal computer or work station) to an output device (printer), and, if it is identified that such printer can execute the print command only partly as shown in the foregoing second embodiment, it is possible to inform the host apparatus of such effect and to provide the user of a message that the image output should be assigned to another printer. It is also possible to inform the host apparatus of the possible output number in advance from each printer, thereby enabling the user to select the printer suitably.

Such configuration will be explained with reference to FIG. 8. In a configuration in which plural printers 201, 202, 203 are connected to a network 200 as shown in FIG. 8, if it is identified, in a print command from a personal computer (PC) 210 to the printer 201, that the printing process cannot be completed based on the output print number, the estimated toner consumption amount and the information on the remaining toner amount as shown in the second embodiment, such information is conveyed from the printer 201 to the PC 210, which in response displays a message that the output should be executed in another printer, for example the printer 202, capable of output operation, thereby requesting a change of the printer from the user.

The present invention may be applied to a system consisting of plural pieces of equipment (for example host computer, interface device, reader, printer etc.) or to an apparatus consisting of a single unit of equipment (for example copying apparatus, facsimile apparatus etc.).

Also, the functions of the aforementioned embodiments of the present invention may be realized by software, and the object of the present invention may naturally be realized also by supplying a system or an apparatus with a recording medium (memory medium) storing program codes of a software realizing such functions and reading and executing such program codes stored in the recording medium by a computer (or CPU or MPU) of such system or apparatus.

In such case, the program codes themselves read from the recording medium realize the functions of the aforementioned embodiments, and the recording medium storing the program codes constitutes the present invention.

The recording medium storing the program codes and the variable data such as the table can be, for example, a floppy disk, a hard disk, an optical disk, a magnetooptical disk, a CD-ROM, a CD-R, a DVD, a magnetic tape, a non-volatile memory card (IC memory card) or a ROM.

The present invention includes not only a case where the computer executes the read program codes, thereby realizing the functions of the aforementioned embodiments, but also a case where an operating system or the like functioning on the computer executes all the processes or a part thereof under the instructions of the program codes, thereby realizing the functions of the aforementioned embodiments.

The invention claimed is:

1. An image ratio measuring method in an image forming apparatus for executing image formation by depositing a coloring material on a print medium based on image data, the method comprising:
    an input step of entering image data;
    a first conversion step of executing γ-conversion to the image data entered in said input step;
    an image forming step of executing an image formation based on the image data converted in said first conversion step;
    a second conversion step of converting the image data before being subjected to the γ-conversion in said first conversion step into image data having a linear relationship with the image density; and
    a calculation step of calculating an image ratio, based on the number of pixels in which the coloring material is deposited onto the print medium based on the image data converted in said second conversion step, the number of pixels corresponding to the size of the print medium, and the number of gradation levels per pixel.

2. A method according to claim 1, wherein said second conversion step includes executing conversion of image data normalized with the density scale in the pixel unit.

3. A method according to claim 1, wherein said calculation step includes calculating the image ratio by dividing the number of pixels of deposition on the print medium by a value obtained by multiplying the total number of pixels corresponding to the size of the print medium with the number of gradation levels.

4. A method according to claim 1, further comprising a second calculation step of calculating the consumption amount of the coloring material consumed in the image formation, based on the image ratio.

5. A method according to claim 4, wherein said calculation step includes calculating the consumption amount of the coloring material by multiplying the consumption amount of the coloring material in a unit area in a solid image formation, the image ratio and the size of the print medium.

6. A method according to claim 4, further comprising:
    an accumulation step of accumulating the consumption amount of the coloring material;
    a detection step of detecting the remaining amount of the coloring material, from the accumulated value accumulated in said accumulation step and an initial amount of the coloring material;
    a discrimination step of discriminating whether an instructed image formation can be executed with the remaining amount detected in said detection step; and
    a warning step of warning in a case in which it is discriminated in said discrimination step that the execution is not possible.

7. A method according to claim 1, wherein said input step includes entering image data matching the characteristics of the image forming apparatus, and the method further comprises an image forming step of executing image formation based on the image data matching the characteristics of the image forming apparatus.

8. A method according to claim 1, further comprising a second calculation step of calculating a consumption amount of the coloring material in case of executing the image formation based on the γ-converted image data, on the basis of the image ratio calculated in said calculation step.

9. An image forming apparatus comprising:
    input means for entering image data;
    first conversion means for executing γ-conversion on the image data entered by said input means;
    image forming means for executing an image formation based on the image data converted by said first conversion means, by depositing a coloring material on a print medium;
    second conversion means for converting the image data before being subjected to the γ-conversion by said first conversion means into image data having a linear relationship with the image density; and
    calculation means for calculating an image ratio, based on the number of pixels in which the coloring material is deposited onto the print medium based on the image data converted by said second conversion means, the number of pixels corresponding to the size of the print medium, and the number of gradation levels per pixel.

10. An apparatus according to claim 9, wherein said second conversion means executes conversion on image data normalized with the density scale in the pixel unit.

11. An apparatus according to claim 10, wherein said calculation means calculates the image ratio by dividing the number of pixels of deposition onto the print medium by a value obtained by multiplying the total number of pixels corresponding to the size of the print medium with the number of gradation levels.

12. An apparatus according to claim 9, further comprising a second calculation means for calculating the consumption amount of the coloring material consumed in the image formation, based on the image ratio.

13. An apparatus according to claim 12, wherein said calculation means calculates the consumption amount of the coloring material by multiplying the consumption amount of the coloring material in a unit area in a solid image formation, the image ratio and the size of the print medium.

14. An apparatus according to claim 12, further comprising:
    accumulation means for accumulating the consumption amount of the coloring material;

detection means for detecting the remaining amount of the coloring material, from the accumulated value accumulated in said accumulation means and an initial amount of the coloring material;

discrimination means for discriminating whether an instructed image formation can be executed with the remaining amount detected by said detection means; and warning means for warning in a case in which said discrimination means identifies that the execution is not possible.

15. An apparatus according to claim 9, wherein said input means enters image data matching the characteristics of said apparatus, and said apparatus further comprises image forming means for executing image formation based on the image data matching the characteristics of said apparatus.

16. An apparatus according to claim 9, further comprising second calculation means for calculating a consumption amount of the coloring material in case of executing the image formation based on the γ-converted image data, on the basis of the image ratio calculated by said calculation means.

17. An image forming system comprising:

an image data supplying apparatus;

an image processing apparatus for applying a predetermined process including a γ-conversion process to the image data;

an image forming apparatus for executing image formation based on the γ-converted image data;

conversion means for converting the image data before being subjected to the γ-conversion process to image data having a linear relationship with the image density;

first calculation means for calculating an image ratio based on the number of pixels in which the coloring material is deposited onto the print medium based on the image data converted by said conversion means, the number of pixels corresponding to the size of the print medium, and the number of gradation levels per pixel; and second calculation means for calculating the consumption amount of the coloring material based on the image ratio calculated by said first calculation means.

\* \* \* \* \*